Aug. 8, 1967 N. TOFFIN 3,334,522
FORWARD AND REVERSE MECHANISM FOR SELF-PROPELLED
AGRICULTURAL IMPLEMENTS AND THE LIKE
Filed June 14, 1965 2 Sheets-Sheet 1
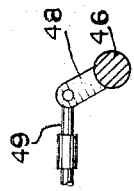
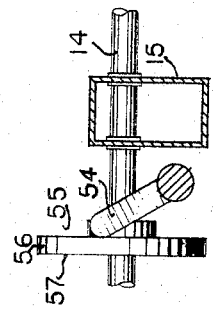
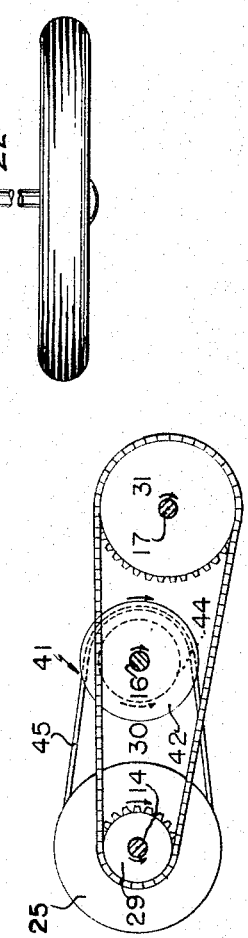
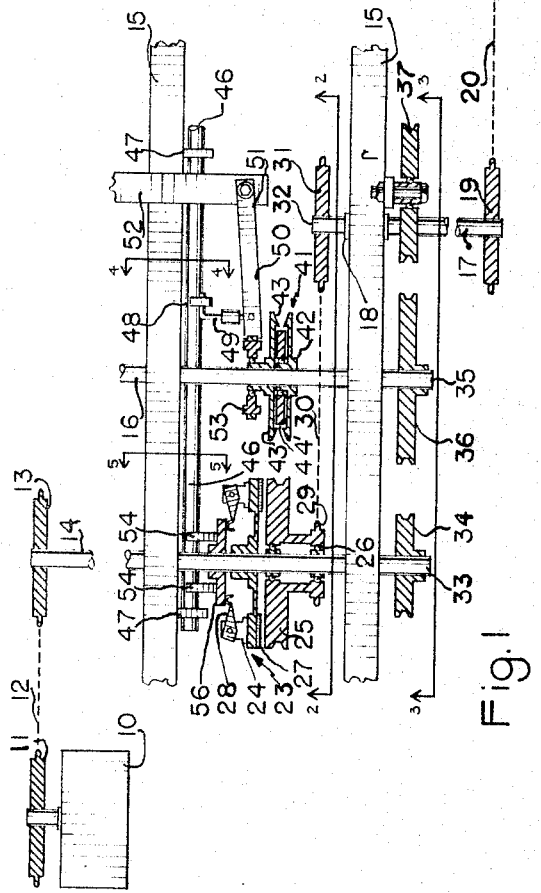
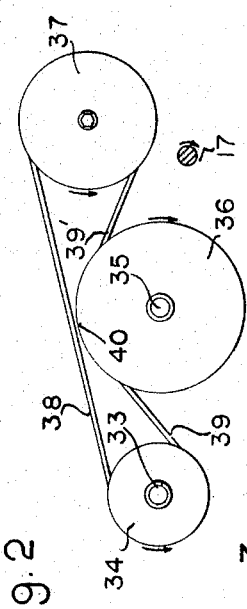
INVENTOR
NICHOLAS TOFFIN Aug. 8, 1967    N. TOFFIN    3,334,522
FORWARD AND REVERSE MECHANISM FOR SELF-PROPELLED
AGRICULTURAL IMPLEMENTS AND THE LIKE
Filed June 14, 1965    2 Sheets-Sheet 2
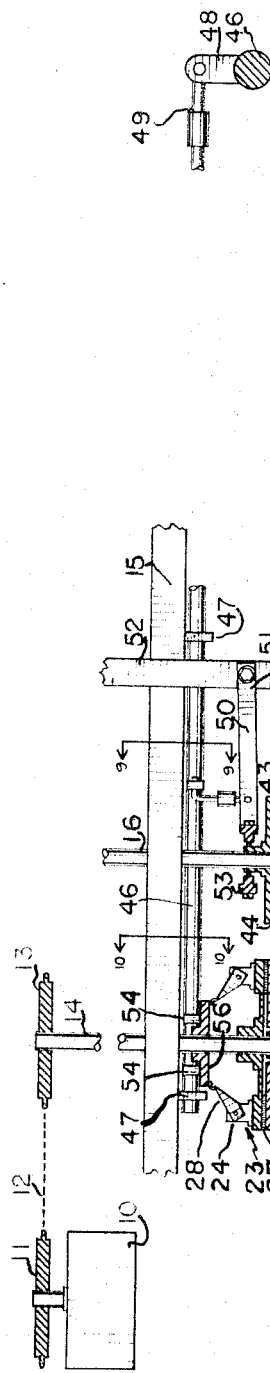
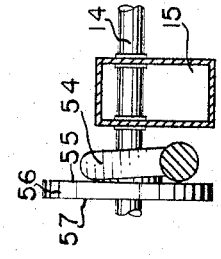
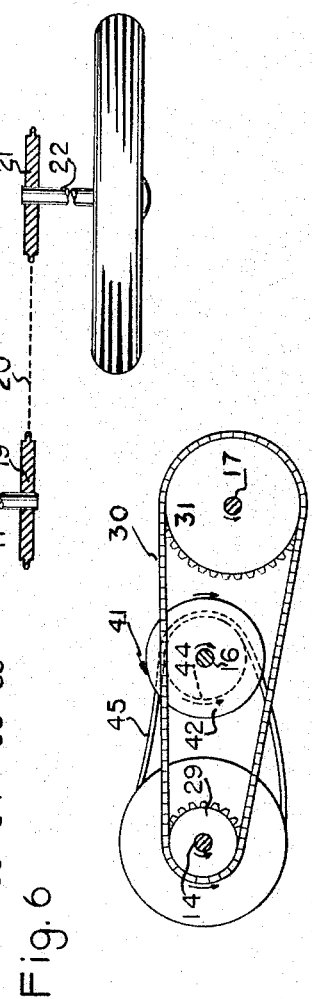
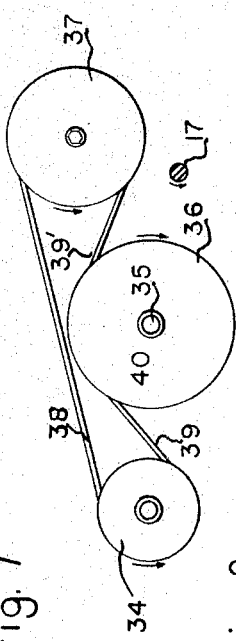

United States Patent Office 3,334,522
Patented Aug. 8, 1967

3,334,522
FORWARD AND REVERSE MECHANISM FOR SELF-PROPELLED AGRICULTURAL IMPLEMENTS AND THE LIKE
Nicholas Toffin, 856 Nottingham Ave., Winnipeg 15, Manitoba, Canada
Filed June 14, 1965, Ser. No. 463,555
6 Claims. (Cl. 74—220)

ABSTRACT OF THE DISCLOSURE

The invention relates to a forward and reverse drive for a driven shaft in which the drive extends from a source of power to a main drive shaft having a clutch element and thence to the driven shaft if it is desired that the driven shaft rotate in one direction. An intermediate shaft is also connected to the main drive shaft and has releasable pulley component thereon which is normally inoperative if the driven shaft rotates as aforesaid. However, if it is desired to reverse the rotation of the driven shaft then the clutch is released and the pulley component brought into operation so that the drive then passes from the drive shaft, to the intermediate shaft, through the releasable pulley component and back to the clutch portion thus reversing the direction of rotation of the driven shaft.

---

My invention relates to new and useful improvements in forward and reverse mechanisms for self-propelled implements and the like.

Although primarily concerned with such agricultural implements as self-propelled swathers and the like, it nevertheless will be appreciated that the device can be adapted for use in other vehicles or implements.

Implements of this general class are usually controlled, as far as steering is concerned, by having an independent drive to each wheel operated from a common source of power. By disconnecting the drive to one wheel and applying a brake to this wheel, the power to the other wheel turns the implement around the disconnected wheel.

Under certain circumstances, a sharper turn can be made by reversing one wheel and maintaining the forward drive to the other wheel.

The mechanisms normally involved in transmitting the drive from the source of power to the wheels is usually relatively cumbersome, contains a relatively large number of parts or components, and is therefore not only expensive to produce but is subject to considerable failure due to the breakdown of parts.

Also, such mechanisms are relatively difficult to maintain in fine adjustment and it has been found that if these devices get out of adjustment, the operation thereof is inefficient.

I have overcome these disadvantages by providing a main drive shaft connected to a source of power and having a clutch element thereon. A chain drive extends from the clutch element to the driven wheels and the main drive shaft also is connected by belt to an intermediate shaft which contains a releasable pulley component. This releasable pulley component is belt connected back to the clutch and normally is inoperative as the forward drive passes from the clutch, to the driven wheels by the aforementioned chain drive.

However, by releasing the clutch and tightening the releasable pulley component, the drive passes from the drive shaft, to the intermediate shaft, through the releasable pulley component and back to the clutch portion carrying the chain sprocket which is thus caused to revolve in the opposite direction to the drive shaft thus giving a reverse drive to the driven shaft.

The actuation of the clutch and the releasable pulley assembly is by a simple control rod, partial rotation of which operates both components concurrently.

This mechanism is simple in construction, contains very little components, and is readily adjusted for operation.

Another advantage or object of the invention is that the device may be contained in a relatively small space and is easily connected both to the source of power and to the driven wheels.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a plan view sectioned in part of one half of the device showing the assembly in the "reverse" position.

FIGURE 2 is a view along the line 2—2 of FIGURE 1.
FIGURE 3 is a view along the line 3—3 of FIGURE 2.
FIGURE 4 is a fragmentary section along the line 4—4 of FIGURE 1.
FIGURE 5 is a fragmentary section along the line 5—5 of FIGURE 1.
FIGURE 6 is a view similar to FIGURE 1 but showing the device in the "forward" position.
FIGURE 7 is a view along the line 7—7 of FIGURE 6.
FIGURE 8 is a view along the line 8—8 of FIGURE 6.
FIGURE 9 is a fragmentary section along the line 9—9 of FIGURE 6.
FIGURE 10 is a fragmentary section along the line 10—10 of FIGURE 6.

In the drawings like characters of reference indicate corresponding parts in the different figures.

In the enclosed drawings one half of the device has been shown, it being understood that similar mechanism is situated side by side with the illustrated mechanism and adapted to operate the other driven wheel of the vehicle.

FIGURES 1 to 5 inclusive show the position of the mechanism in the reverse position and FIGURES 6 to 10, are similar views to FIGURES 1 to 5 respectively but showing the mechanism in the "forward" position.

Proceeding therefore to describe the invention in detail, reference character 10 illustrates a source of power operating a chain wheel 11 and connected by means of a chain 12 to a further chain wheel 13 which is connected to a main drive shaft 14 which is common to both halves of the mechanism.

This drive shaft 14 is carried within bearings (not illustrated) mounted upon supporting structure 15 consisting of a pair of spaced and parallel frame members.

Also mounted within the frame members and common to both halves is an intermediate shaft 16. A driven shaft 17 is journalled within bearings 18 to one of the frame members 15 and only one of the driven shafts is illustrated, it being understood that there is a corresponding driven shaft in the other half of the device.

This driven shaft is provided with a chain sprocket 19 and chain 20 connects this sprocket to a further sprocket 21 connected to the driven axle 22 of one of the wheels of the vehicle or implement.

A clutch assembly collectively designated 23 is mounted upon the drive shaft 14 and comprises the movable portion 24 keyed to the shaft 14 but slidable thereon. The free portion 25 is journalled to the shaft by means of bearings 26 and is connected or disconnected to the portion 24 by means of clutch plate 27 and spring loaded operating fingers 28 all of which is conventional.

Incorporated with the free portion 25 of the clutch assembly 23 is a sprocket gear 29 connected by means of chain 30 to a further sprocket gear 31 secured to the inner end 32 of the aforementioned driven shaft 17 so that when the clutch is in the engaged position shown in FIGURE 6, the drive is transmitted from the source of power, via sprocket 11 and chain 12 to sprocket 13 and hence to drive shaft 14. This drive shaft rotates the entire clutch assembly 23 thus transmitting drive via the chain 30 to the driven shaft 17 and hence to the wheel shaft 22.

FIGURE 7 shows the direction of rotation of the above mentioned components when the mechanism is in the position shown in FIGURE 6.

Secured to one end 33 of the drive shaft 14 is a belt pulley 34 and secured to one end 35 of the intermediate shaft 16 is a further pulley 36. Journalled for rotation to the frame member 15 and in alignment with pulleys 34 and 36 is an idler pulley 37.

A belt 38 extends around pulleys 34 and 37 with the under run 39 of the belt passing around pulley 34 becoming the upper run 39' around the upper portion or upper arc 40 of the pulley 36 as clearly shown in FIGURE 8.

This means that the direction of rotation of the pulley 36 is reversed by the belt 38 with respect to the direction of rotation of the pulley 34, so that the intermediate shaft 16 is travelling in a direction opposite to that of drive shaft 14.

This intermediate shaft 16 carries a releasable pulley assembly collectively designated 41. This pulley component comprises a fixed portion 42 keyed to the shaft 16, a movable portion 43 rotatable with the shaft but slidable thereon, and an idling center portion 44 freely rotatable upon the shaft. The construction of this pulley component is conventional and when it is in the open position shown in FIGURE 6, a belt 45 extending around this pulley and around a pulley 46 formed on the aforementioned portion 25 of the clutch, idles upon the free center section 44 and this belt is shown in FIGURE 7 in a loose or idling position.

In this position, this portion of the device is inoperative.

However, when it is desired to reverse the driven shaft 17 and hence the wheel shaft 22, the clutch is disengaged and the reversible pulley component 41 is closed or engaged so that they take up the position shown in FIGURE 1.

Under these circumstances, the portion 24 of the clutch assembly which is keyed to shaft 14 is no longer connected to the portion 25.

At the same time the belt 45 is tightened so that the drive is transmitted from the shaft 14, via pulley 34 and belt 38 to the intermediate shaft 16 which is revolving in the opposite direction to the drive shaft. As the pulley component 41 is now closed, the drive is transmitted from this pulley component back to the free portion 25 of the clutch, is revolved in a direction opposite to shaft 14 and hence via chain 30 to the shaft 17 which also revolves in a direction opposite to shaft 14 and the direction of these various shafts and pulleys is shown in FIGURE 7.

Means are provided to actuate both the clutch assembly and the pulley component 41 simultaneously and takes the form of an actuating shaft or rod 46 journalled for partial rotation within bracket 47 secured to one of the members 15 and lying at right angles to the shafts 14, 16 and 17, it being understood that there is one actuating rod for each half of the mechanism.

This actuating rod is provided with a lug 48 secured thereto and extending upwardly therefrom and an adjustable link 49 extends from this lug to intermediate the ends of a lever 50 pivotally secured by one end 51 thereof to a cross brace 52.

The other end of link 50 is connected to a thrust race 53 in turn connected to the movable side 43 of the pulley component 41 so that rotation of the rod 46 causes the lug to move from the position shown in FIGURE 9 to the position shown in FIGURE 4 and thus close the pulley component 41 to the position shown in FIGURE 1.

Rod 46 is also provided with a pair of lugs 54 secured thereto adjacent the clutch component 23.

These lugs engage upon one side 55 of a clutch release bearing 56 freely journalled upon shaft 14.

The other side 57 of this bearing is engaged by the clutch release fingers 28 in the usual manner so that rotation of rod 46 from the position shown in FIGURE 10 to the position shown in FIGURE 5 disengages the clutch to the position shown in FIGURE 1.

It should be realized that as the clutch is disengaged, the pulley component 41 is engaged and vice versa so that merely by rotating the rod 46, the mechanism is moved from forward to reverse positions as shown in FIGURES 6 and 1 respectively.

Conventional linkage and levers (not illustrated) extend from rods 46 to adjacent the drivers' position so that by manipulating the two levers, the direction and turning motion of the implement may be controlled readily and easily.

Since various modifications can be made to the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

What I claim as my invention is:

1. A forward and reverse mechanism for self-propelled agricultural implements and the like, comprising in combination with a source of power, and supporting structure, a main drive shaft, a driven shaft, and an intermediate shaft, said shafts being journalled for rotation within said supporting structure and in spaced and parallel relationship with one another, a clutch assembly on said drive shaft, said clutch assembly including a drive component keyed to said drive shaft and a driven component journalled for free rotation on said drive shaft, means for connecting and disconnecting said drive component to said driven component, means operatively connecting said driven component to said driven shaft, a releasable pulley component on said intermediate shaft, belt means operatively extending from said driven component to said releasable pulley component, a reversing drive assembly operatively connecting said drive shaft to said intermediate shaft, and means operatively connected to said releasable pulley component and to said clutch assembly whereby when said clutch assembly is engaged said releasable pulley assembly is released and vice versa.

2. The device according to claim 1 in which said reversing drive assembly includes a first pulley secured for rotation to said drive shaft, a second pulley secured for rotation to said intermediate shaft, and an idler pulley journalled for rotation to said supporting framework, a belt extending around said pulleys, the under run of said belt around said first pulley becoming the upper run around said second pulley to rotate said second pulley and hence said intermediate shaft in a direction opposite to the direction of rotation of said drive shaft.

3. The device according to claim 2 in which said last mentioned means includes an actuating rod journalled for partial rotation within said framework transversely of said shafts, a lug extending at right angles to said rod, a lever pivotally connected by one end thereof to said supporting framework, an actuating fork on the other end of said lever, said actuating fork engaging said releasable pulley component for engaging and releasing said pulley component, and an adjustable link extending from said lug to intermediate the ends of said lever.

4. The device according to claim 3 which includes a pair of clutch operating lugs extending at right angles from said rod, a clutch release bearing on said drive shaft, said clutch operating lugs engaging one side of said clutch release bearing, release fingers on said clutch assembly, said release fingers of said clutch assembly engaging the other side of said clutch release bearing.

5. The device according to claim 1 in which said last mentioned means includes an actuating rod journalled for partial rotation within said framework transversely of said shafts, a lug extending at right angles to said rod, a lever pivotally connected by one end thereof to said supporting framework, an actuating fork on the other end of said lever, said actuating fork engaging said releasable pulley component for engaging and releasing said pulley component, and an adjustable link extending from said lug to intermediate the ends of said lever.

6. The device according to claim 5 which includes a pair of clutch operating lugs extending at right angles from said rod, a clutch release bearing on said drive shaft, said clutch operating lugs engaging one side of said clutch release bearing, release fingers on said clutch assembly, said release fingers of said clutch assembly engaging the other side of said clutch release bearing.

References Cited

UNITED STATES PATENTS

| | | | |
|---|---|---|---|
| 1,250,903 | 12/1917 | Kyle | 74—220 |
| 2,799,175 | 7/1957 | Peck | 74—218 |
| 3,190,385 | 6/1965 | Allport | 74—220 |

FRED C. MATTERN, JR., *Primary Examiner.*

DAVID J. WILLIAMOWSKY, *Examiner.*

J. A. WONG, *Assistant Examiner.*